No. 683,117. Patented Sept. 24, 1901.
L. K. HAAK.
SAW HANDLE.
(Application filed Nov. 26, 1900.)
(No Model.)
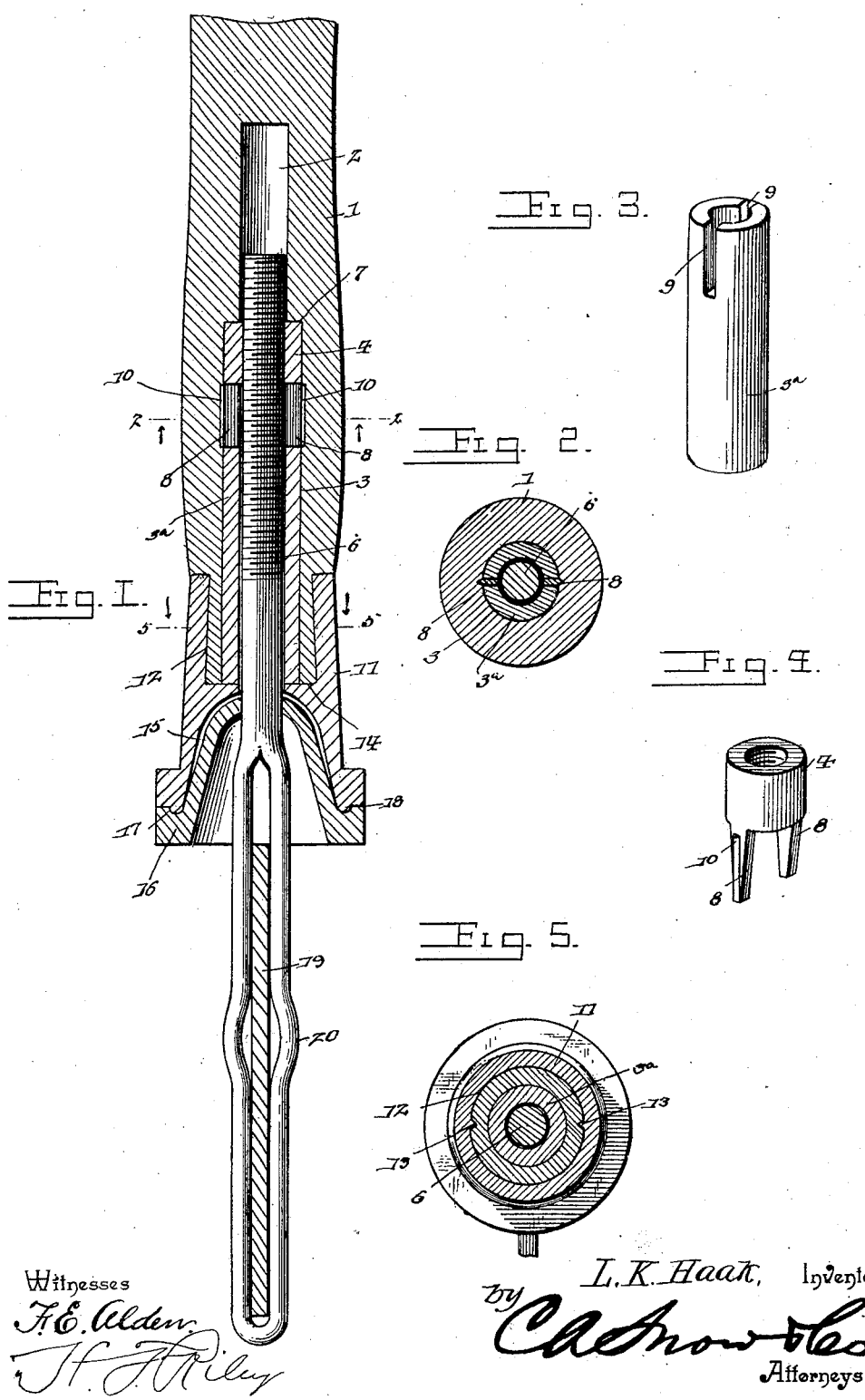
Witnesses
F. E. Alden
J. F. Riley
L. K. Haak, Inventor.
by C. A. Snow & Co.
Attorneys

UNITED STATES PATENT OFFICE.

LUTHER K. HAAK, OF LUTHER, MICHIGAN.

SAW-HANDLE.

SPECIFICATION forming part of Letters Patent No. 683,117, dated September 24, 1901.

Application filed November 26, 1900. Serial No. 37,825. (No model.)

*To all whom it may concern:*

Be it known that I, LUTHER K. HAAK, a citizen of the United States, residing at Luther, in the county of Lake and State of Michigan, have invented a new and useful Saw-Handle, of which the following is a specification.

The invention relates to improvements in saw-handles.

The object of the present invention is to improve the construction of handles for crosscut-saws and to provide a simple and comparatively inexpensive handle possessing great strength and durability and adapted to be readily applied to and removed from a saw-blade.

Another object of the invention is to provide a handle of this character which will not become loose or detached from the saw-blade while in use and in which the wooden portion of the handle will not be split by the nut for engaging the yoke-bar.

The invention consists in the construction and novel combination and arrangement of parts hereinafter fully described, illustrated in the accompanying drawings, and pointed out in the claims hereto appended.

In the drawings, Figure 1 is a longitudinal sectional view of a saw-handle constructed in accordance with this invention. Fig. 2 is a horizontal sectional view on the line 2 2 of Fig. 1. Fig. 3 is a detail perspective view of the wooden sleeve. Fig. 4 is a similar view of the nut. Fig. 5 is a sectional view on the line 5 5 of Fig. 1.

Like numerals of reference designate corresponding parts in all the figures of the drawings.

1 designates a wooden handle provided at its lower end with a longitudinal bore having a reduced inner portion 2 and a larger outer portion 3, receiving a nut 4 and a sleeve $3^a$. The nut 4, which is provided with interior screw-threads to engage the threads of a yoke-bar 6, is seated against the shoulder 7, formed by the reduced portion 2 of the bore. The nut, which is cylindrical, is provided with longitudinal wings 8, depending from its lower end and engaging the inner or upper end of the sleeve $3^a$, which is constructed of wood and which is designed to be glued or otherwise secured into the enlarged portion 3 of the bore of the handle. The upper end of the wooden sleeve $3^a$ is provided at opposite sides with longitudinal slots 9, which are adapted to receive the longitudinal wings or flanges 8 of the nut, and the said wings or flanges 8 are tapered, as clearly shown in Fig. 4, and are adapted to expand the upper portion of the wooden sleeve within the bore of the handle, whereby the nut and the sleeve are firmly held therein. In order to prevent the nut from rotating independently of the handle, the longitudinal wings or flanges are provided at their outer sides with longitudinal ribs 10, tapering in cross-section to provide sharp edges and embedded in the walls of the bore of the handle, as clearly shown in Fig. 1, whereby the nut is rigidly held in the bore. In assembling the parts the nut is forced into the bore and is seated against the shoulder 7, and the wooden sleeve is then driven into the bore and is expanded by the tapered wings or flanges 8. The sleeve is further confined in the bore by a ferrule 11, having a tapered socket 12, gradually decreasing in diameter toward its upper or inner end and adapted when driven on the lower or outer end of the handle to compress the same at a point between the ends of the wooden sleeve. The handle also expands within the socket portion of the ferrule, which is provided with ribs 13 to engage the said handle. The ribs, which are tapered in cross-section, as clearly shown in Fig. 5, are embedded in the handle, and they prevent the ferrule from rotating on the same. The ferrule is provided between its ends with an interior annular flange 14, dividing the ferrule into upper and lower socket portions and forming a seat for the lower end of the handle, whereby the latter is prevented from sinking too far into the ferrule. The interior annular flange also serves to support the yoke-bar, whereby the latter is prevented from being twisted or otherwise injured by lateral strain, and the liability of the said yoke-bar to breakage within the handle is reduced to a minimum.

The lower inverted socket of the ferrule is tapered or slightly conical to receive a tapering approximately conical washer 15, which is provided at its lower end with an outwardly-extending annular flange 16, having an annular groove 17 at its upper face to receive a depending annular rib 18, formed integral with and arranged at the lower end of the ferrule. The annular rib 17 is rounded, and it forms a bearing or seat for firmly supporting the cup-shaped washer 15, which is adapted to engage the blade 19 of a saw. The yoke-bar is provided with the usual opening for the saw-blade, and the sides are expanded to form stops 20 to prevent the washer from leaving the yoke-bar.

It will be seen that the saw-handle is exceedingly simple and inexpensive in construction, that it possesses great strength and durability, and that it is adapted to be readily operated to clamp and release a saw-blade. It will also be apparent that when the handle is rotated on the yoke-bar in a direction to force the washer downward the latter will be firmly engaged with the saw-blade and that there is no liability of the nut splitting the handle, as the said nut is seated against a solid portion of the handle, and the latter is reinforced by the wooden sleeve or lining, which is subjected to the principal portion of the strain incident to rotating the nut. It will also be apparent that the yoke-bar is supported rigidly at two points within the handle—viz., at the nut and at the interior annular flange of the ferrule, which is rigid with the handle—and that the said yoke-bar is thereby relieved of lateral strain and is prevented from breaking within the handle; also, the sleeve or lining is expanded at its inner end and the handle is compressed around it near its outer end, and the outer end of the handle is permitted to expand within the tapered upper socket portion of the ferrule.

What I claim is—

1. A device of the class described comprising a wooden handle having a bore, a wooden sleeve arranged within the bore and provided with slots at its inner end, and a nut arranged within the handle and provided with wings extending into the slots of the sleeve and expanding the latter, said wings being provided at their outer faces with ribs embedded in the walls of the bore of the handle, substantially as described.

2. A device of the class described comprising a wooden handle, a nut arranged within the same, a sleeve constructed of expansible material and having its inner end engaged by the nut and expanded within the handle; a ferrule having upper and lower socket portions and provided with an interior seat receiving the handle, the lower socket portion being tapered and the ferrule being provided at its lower end with a rounded rib, and a tapering washer fitting within the lower socket portion of the ferrule and provided with an annular flange having a groove to receive the said rib, substantially as described.

In testimony that I claim the foregoing as my own I have hereto affixed my signature in the presence of two witnesses.

LUTHER K. HAAK.

Witnesses:
JAMES COLEMAN,
BLANCHE A. HEADLEY.